US012391592B2

(12) United States Patent
Frisky et al.

(10) Patent No.: US 12,391,592 B2
(45) Date of Patent: Aug. 19, 2025

(54) METHOD FOR WASTEWATER TREATMENT

(71) Applicant: Ground Effects Environmental Services Inc., Regina (CA)

(72) Inventors: Sean Frisky, Regina (CA); Jason Beaudin, Regina (CA); Justin Lee, Regina (CA); Joel Wolensky, Regina (CA)

(73) Assignee: Ground Effects Environmental Services Inc., Regina (CA)

( * ) Notice: Subject to any disclaimer, the term of this patent is extended or adjusted under 35 U.S.C. 154(b) by 312 days.

(21) Appl. No.: 17/007,478

(22) Filed: Aug. 31, 2020

(65) Prior Publication Data

US 2021/0284559 A1 Sep. 16, 2021

Related U.S. Application Data

(60) Provisional application No. 62/989,264, filed on Mar. 13, 2020.

(51) Int. Cl.
*C02F 9/00* (2023.01)
*C02F 1/00* (2023.01)
(Continued)

(52) U.S. Cl.
CPC .............. *C02F 9/00* (2013.01); *C02F 1/004* (2013.01); *C02F 1/24* (2013.01); *C02F 1/463* (2013.01);
(Continued)

(58) Field of Classification Search
CPC .... C02F 1/004; C02F 1/24; C02F 1/38; C02F 1/463; C02F 1/56; C02F 1/66; C02F 1/78;
(Continued)

(56) References Cited

U.S. PATENT DOCUMENTS 4,872,959 A 10/1989 Herbst
5,635,040 A 6/1997 Barhir
(Continued)

OTHER PUBLICATIONS

G. Liescheidt, Ozone Treatment for Cooling Towers, CED engineering, Dec. 1995, p. 1-5 (Year: 1995).*

(Continued)

*Primary Examiner* — Chester T Barry
(74) *Attorney, Agent, or Firm* — Standley Law Group LLP; Beverly A. Marsh; Kenny W. Pung

(57) ABSTRACT

A system and method for treating a liquid containing contaminants during oil production. The system and method including an inlet for feeding the liquid containing contaminants through an EOX reactor such that a coagulant is added, by passing a current through a fluid (electrocoagulation), to separate contaminants from the liquid and produce a coagulated liquid, an ozone generator for adding ozone to an ozone reactor to destruct hydrogen sulfide, and to further oxidize any remaining contaminants in the coagulated liquid to form an initially treated liquid, a Dissolved Air Flotation Tank (DAF) for the removal of bulk precipitated suspended solids, floc, oils and greases, a pump for pumping the treated liquid from the DAF tank to a filtration mechanism for filtering residual oils and contaminants from the treated liquid to form a filtered liquid.

9 Claims, 8 Drawing Sheets

(51) Int. Cl.
*C02F 1/24* (2023.01)
*C02F 1/463* (2023.01)
*C02F 1/56* (2023.01)
*C02F 1/78* (2023.01)
*C02F 101/10* (2006.01)
*C02F 101/32* (2006.01)
*C02F 103/10* (2006.01)

(52) U.S. Cl.
CPC ............... *C02F 1/56* (2013.01); *C02F 1/78* (2013.01); *C02F 2101/101* (2013.01); *C02F 2101/32* (2013.01); *C02F 2103/10* (2013.01); *C02F 2303/04* (2013.01)

(58) Field of Classification Search
CPC ...... C02F 2001/46133; C02F 2101/006; C02F 2101/101; C02F 2101/103; C02F 2101/203; C02F 2101/32; C02F 2103/10; C02F 2303/04; C02F 9/00; C02F 2001/46119; C02F 1/001; C02F 1/40; C02F 1/441; C02F 1/46109; C02F 1/4672; C02F 1/52; C02F 1/5245; C02F 1/74; C02F 2001/46123; C02F 2201/46125; C02F 2201/46145; C02F 2209/05; C02F 2209/06; C02F 1/008; C02F 1/04; C02F 1/20; C02F 1/283; C02F 1/442; C02F 1/444; C02F 1/4674; C02F 1/488; C02F 11/006; C02F 11/125; C02F 11/13; C02F 2001/007; C02F 2001/46128; C02F 2001/46138; C02F 2001/46171; C02F 2101/16; C02F 2101/206; C02F 2101/30; C02F 2101/322; C02F 2103/06; C02F 2103/16; C02F 2103/365; C02F 2201/4612; C02F 2201/4617; C02F 2201/4619; C02F 2209/001; C02F 2209/005; C02F 2301/022; C02F 2301/046; B01D 17/06; B01D 21/0006; B01D 21/0009; B01D 21/0045; B01D 21/04; B01D 21/10; B01D 21/2461; B01D 17/0205; B01D 17/0211; B01D 17/0214; B01D 17/045; B01D 19/0005
See application file for complete search history.

(56) References Cited

U.S. PATENT DOCUMENTS

| | | |
|---|---|---|
| 6,306,280 B1 | 10/2001 | Reipa |
| 6,391,184 B1 | 5/2002 | Orolin |
| 6,488,835 B1 | 12/2002 | Powell |
| 6,613,217 B1 | 9/2003 | Gilmore |
| 6,689,271 B2 | 2/2004 | Morkovsky |
| 7,264,732 B2 | 9/2007 | Bradley |
| 7,462,287 B2 | 12/2008 | Berrar |
| 9,095,786 B1* | 8/2015 | Richerand ............... B03D 1/24 |
| 9,943,616 B2 | 4/2018 | Kozlov |
| 2004/0079650 A1 | 4/2004 | Morkovsky |
| 2005/0247571 A1* | 11/2005 | Grigg ..................... C02F 1/463 |
| | | 205/743 |
| 2009/0032446 A1 | 2/2009 | Wiemers et al. |
| 2011/0042327 A1* | 2/2011 | Miller .................... C10J 3/466 |
| | | 210/759 |
| 2014/0216946 A1* | 8/2014 | Milner ................... C02F 1/463 |
| | | 210/639 |
| 2017/0001890 A1* | 1/2017 | Milner ...................... C02F 1/40 |
| 2018/0009678 A1* | 1/2018 | Kubala ..................... C02F 1/24 |
| 2018/0080294 A1* | 3/2018 | Frisky .................... B01D 21/04 |
| 2019/0352195 A1* | 11/2019 | Stephenson ........ B01D 19/0005 |

OTHER PUBLICATIONS

Jacqueline, Fracking Injury Risk: Hydrogen Sulfide Is More Than a Foul Smell, Dec. 5, 2016, p. 1-3 (Year: 2016).*

* cited by examiner

METHOD FOR WASTEWATER TREATMENT

TECHNICAL FIELD

This invention relates to systems and methods for wastewater treatment. In particular to systems and methods for removing silica from Steam Assisted Gravity Drainage (SAGD) produced water during oil production.

BACKGROUND

During SAGD oil production, bitumen is generally recovered when steam is injected into a geological formation. Injecting steam typically reduces the viscosity of the bitumen such that the bitumen can flow and be suitable for pumping back to the surface and for further processing. The bitumen contains wastewater, an oil and a condensed steam emulsion that can be separated and treated prior to further treatment for its potential reuse. Effective recycling of the wastewater is desirable for steam generation. The effectiveness is based on the quality of the produced wastewater feed. The higher the quality, the less potential fouling of machinery such as the boilers on site or at the well heads.

For example, the produced water contains emulsified oils, grease, fine solids, dissolved organics, silica, H2S, hardness, and extracting these contaminants for removal has been typically challenging and costly. When water evaporates in the facilities, dissolved silica can form colloidal silica, and can eventually lead to silica scale, which if left untreated, can cause major fouling in the facilities of oil production such as drum boilers or Once Through Steam Generators (OTSGs).

Wastewater containing constituents such as silica and iron are byproducts of SAGD operations during the production of heavy oil. Typically, removing silica can be expensive and can be as high as 80% of the operating cost and 30% of the capital investment of a SAGD water treatment facility. Silica levels in SAGD water could reach up to 4500 ppm.

Therefore, cutting freshwater usage, limiting the amount of produced water being disposed, removing constituents and contaminants, and the recycling of the produced water in the steam production process in an efficient, more cost effective method, has been desirable.

SUMMARY

A system and method for treating a liquid containing contaminants during oil production is provided herein. Contaminants may include silica, iron or the like. The system includes an inlet for feeding the liquid containing contaminants through an EOX reactor such that a coagulant is added to separate contaminants from the liquid and produce a coagulated liquid. The system also includes an ozone generator for adding ozone to an ozone reactor to destruct hydrogen sulfide and to disinfect and oxidize any remaining contaminants in the coagulated liquid to form an ozone-liquid. The ozone-liquid then goes through a pump and is pumped into a dissolved air floatation tank for removing at least one of suspended solids, floc, oils and grease from the ozone-liquid to form an initially treated liquid. A filtration mechanism may be used to filter residual oils and contaminants from the initially treated liquid to form a filtered liquid.

In one aspect, blowdown may be added to increase the pH level of the coagulated liquid.

In another aspect polymer may be added to bind and bridge the floc.

In one aspect the system may include an electrode assembly in the EOX reactor further comprising a first electrode plate and a second electrode plate such that and electrical field is created between the first and second electrode plates causing electrocoagulation of the liquid.

In addition, the treated liquid may be backwashed to remove solids, oils and other particulates and material that has been filtered from the wastewater.

In one aspect, walnut shells may be used in the filtration mechanism for filtering the initially treated liquid.

In another aspect, a method for treating a liquid containing silica during oil production is provided. The method comprises: providing an electric oxidation reactor to treat the liquid to electric oxidation treatment; feeding the liquid containing silica into the electric oxidation reactor and adding a coagulant to separate contaminants including silica from the liquid to produce a coagulated liquid; providing an ozone reactor for receiving the coagulated liquid from the electric oxidation reactor; adding ozone to the coagulated liquid in the ozone reactor to destruct hydrogen sulfide and to disinfect and oxidize contaminants in the coagulated liquid to form an ozone-liquid; providing a dissolved air floatation tank for receiving the ozone-liquid from the ozone reactor; removing a suspended mass containing silica in the ozone-liquid to form an initially treated liquid; providing a filtration mechanism for receiving the initially treated liquid; filtering residual oils and contaminants from the initially treated liquid using the filtration mechanism to form a filtered liquid.

A method for removing silica from a liquid containing silica is provided. The method comprises: directing the liquid to an electric oxidation reactor to treat the liquid by electric oxidation; after the liquid is subjected to electric oxidation, directing the liquid to an ozone reactor to treat the liquid by introducing ozone into the liquid; and after the liquid has passed through the ozone reactor, directing the liquid to a dissolved air floatation tank and skimming off floating floc from the liquid and removing settled sludge containing silica from the liquid in the dissolved air floatation tank.

BRIEF DESCRIPTION OF THE DRAWINGS

While the invention is claimed in the concluding portions hereof, example embodiments are provided in the accompanying detailed description which may be best understood in conjunction with the accompanying diagrams:

DETAILED DESCRIPTION OF THE ILLUSTRATED EMBODIMENTS

Figure 1:
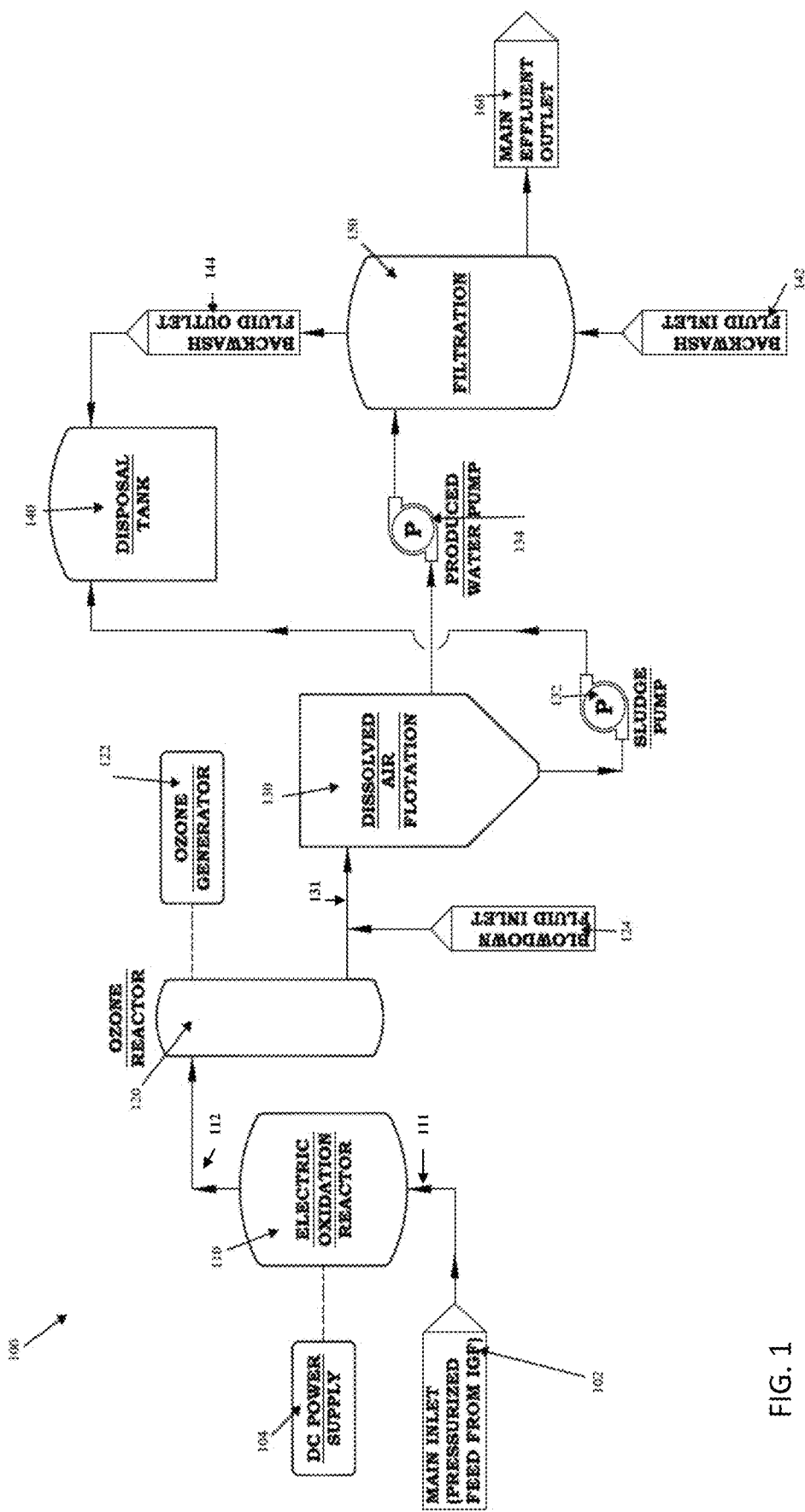
FIG. 1 is a schematic view of a wastewater treatment system according to one aspect.

A wastewater treatment system 100 for treating wastewater 102 or a liquid containing contaminants is provided. With reference to FIG. 1, the wastewater treatment 100 may comprise an electric oxidation (EOX) reactor 110, an ozone reactor 120, a dissolved air floatation, aka, dissolved air flotation, (DAF) tank 130, a disposal tank 140 and a filtration mechanism 150. An EOX reactor 110 may be used to first treat wastewater 102 using electric oxidation. Electric oxidation (EOX) is a means of adding a coagulant to water in situ, through the dissolution of a sacrificial metal anode. The metal ions that are released form reactive metal hydroxides that act as destabilizing agents and leads to charge neutralization, causing pollutants to coagulate and be removed. The electric oxidation involves several physical and chemical processes. It may include supplying a voltage to a pair of electrode plates placed in the wastewater to cause the metal ions release from the reactive metal hydroxides as discussed in the embodiment. Therefore when EOX reactor 110 is filled with liquid or wastewater and flow is observed, the interior of the EOX reactor 110 may be energized by power supply 104. Power from power supply 104 can be supplied for a period of time to allow the electro-coagulation to work and the contaminants to destabilize out of the liquid. The elevated pressure can be maintained while the power is being supplied.

Once the wastewater 102 has been treated to destabilize the contaminants, e.g. silica, the wastewater can be evacuated from the EOX reactor 110 through EOX reactor outlet 112 and is routed downstream for further treatment in the ozone reactor 120. Following electric oxidation, the wastewater may be further treated in the ozone reactor 120 where ozone is introduced from an ozone generator 122 into the wastewater in the ozone reactor 120. Ozone has the ability to oxidize contaminants such that ozone molecules can react with a substrate (direct pathway) or with hydroxide ions or radicals (indirect pathway) thereby destructing hydrogen sulfide (H2S) and disinfecting and oxidizing other contaminants.

In one aspect, blowdown may be added at blowdown fluid inlet 124 to the ozone reactor 120 upfront of the EOX reactor 110. The addition of blowdown may increase the pH of the produced water, providing the ability to increase removal efficiency of the silica in the process along with reducing the overall hardness and additional removal of silica.

After the oxidation treatment in the ozone reactor 120, liquid or wastewater may be transferred from the ozone reactor 120 and routed downstream for further treatment in the DAF tank 130 because, although destabilization occurs leading to coagulation (floc formation), the majority of silica may be removed in the DAF.

Figure 2:
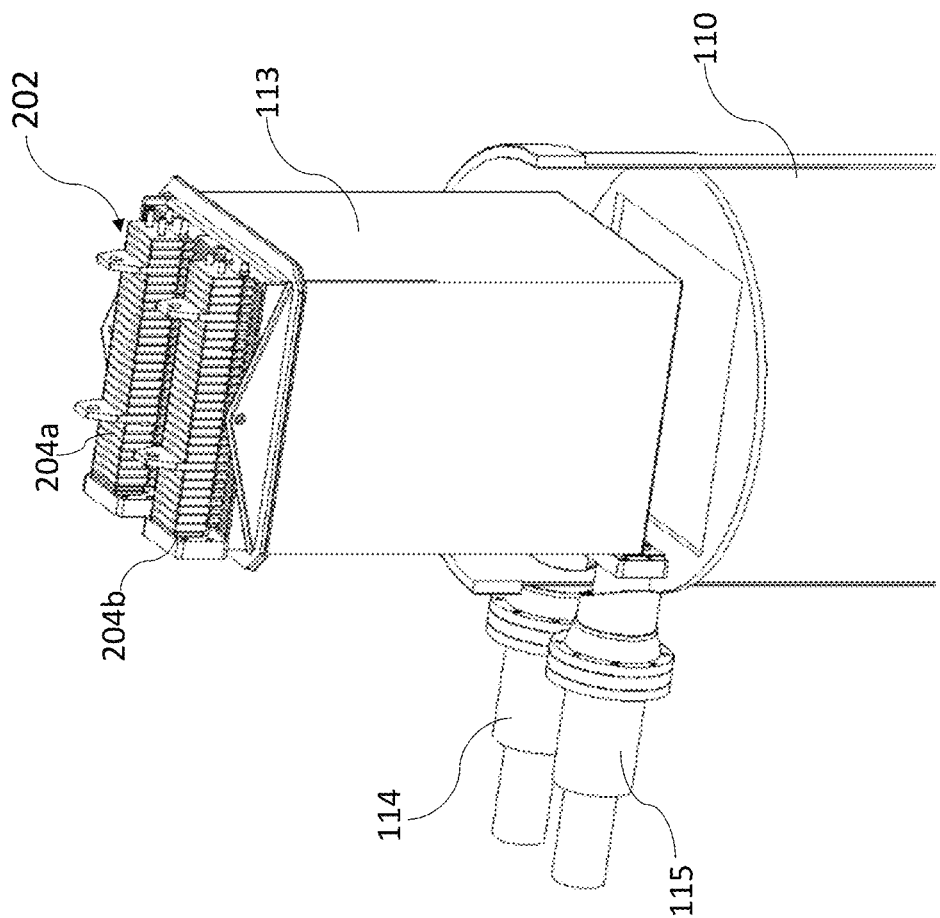
FIG. 2 is an exploded perspective view of an electric oxidation (EOX) reactor of the wastewater treatment system of FIG. 1.
Figure 3:
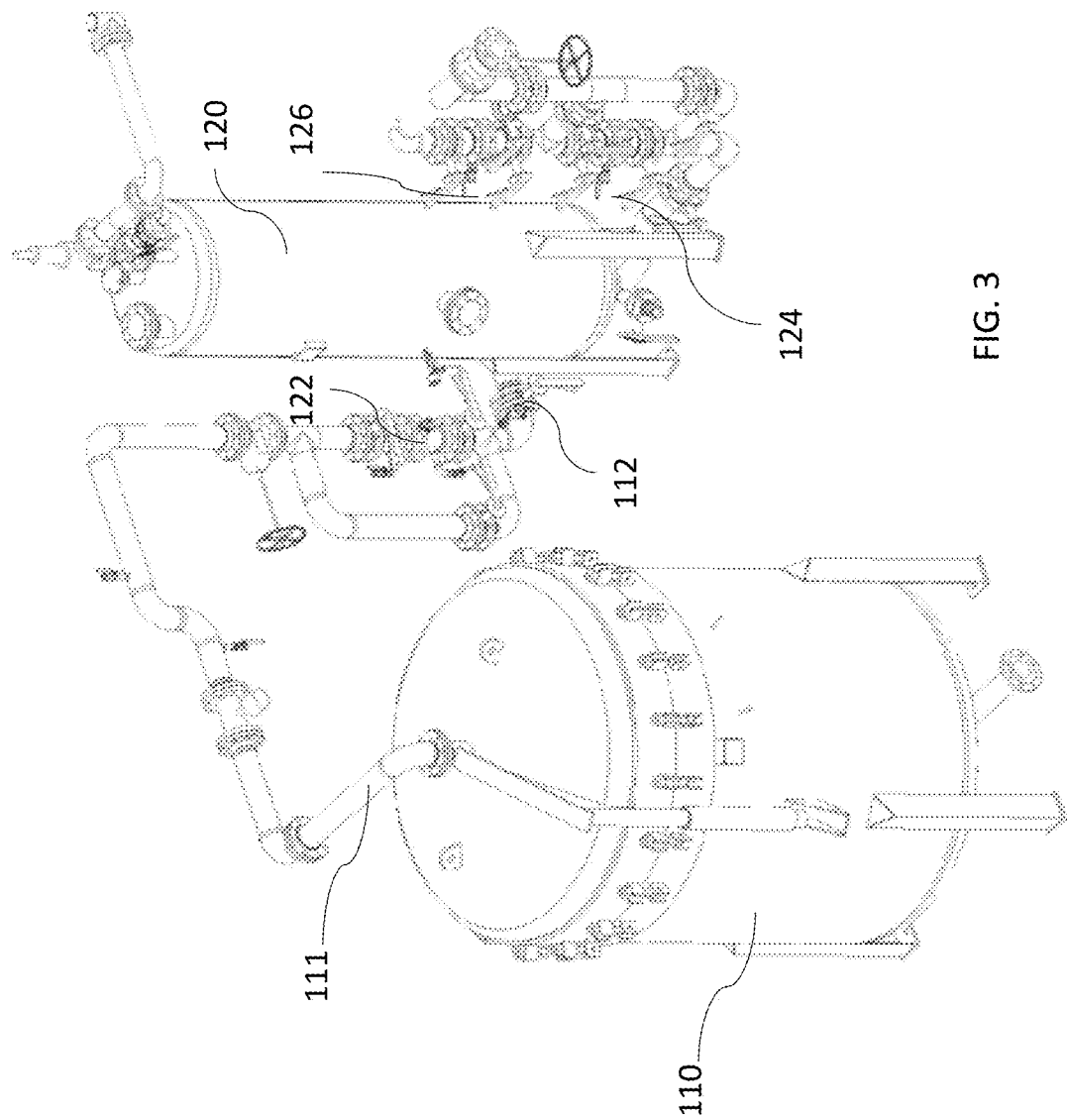
FIG. 3 is a perspective view of two reactors of the wastewater treatment system of FIG. 1.
Figure 4:
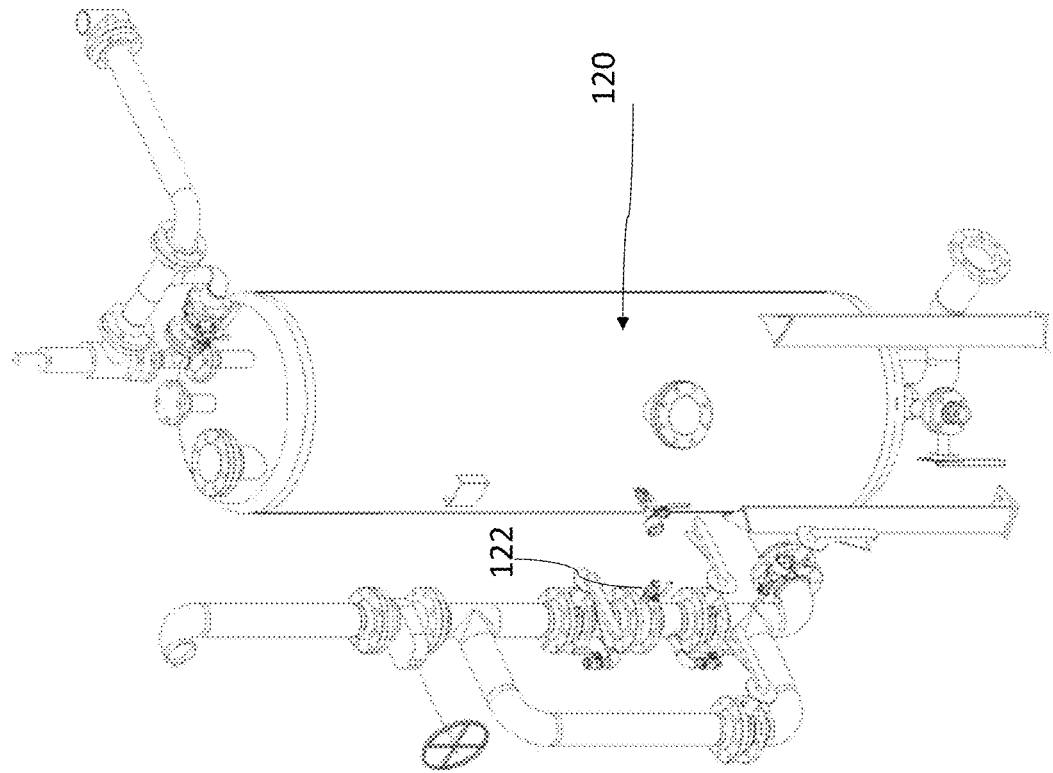
FIG. 4 is a perspective view of an ozone reactor of the wastewater treatment system of FIG. 1.

The wastewater may then be introduced into DAF tank 130 for removal of suspended solids (TSS)/flock, silica, iron, and oils and grease. In addition, floc may be collected from the DAF tank 130 and may be pumped into a disposal tank 140 or dewatered by means of centrifugation and by way of sludge pump 132. Wastewater treated by the DAF tank 130 may then be transferred with produced water pump 134 and further treated by a filtration mechanism 150. Depending on the type of filtration mechanism 150, there may be the requirement to backwash via a backwash fluid inlet 142 and backwash fluid outlet 144 to remove solids, oil and other contaminants that have been filtered from the wastewater and filtration mechanism 150 with effluent discharge from the main effluent outlet 160 being directed downstream for additional processing or use. With reference to FIGS. 2-4, details of the EOX reactor 110 and ozone reactor 120 will be described in further detail hereinafter.

As shown in FIG. 2, an EOX reactor 110 can be used to treat municipal, industrial, oil and gas wastewater streams or other liquid similar in nature under pressure. For example, the produced water from oil production may be treated based on the technology of steam-assisted gravity drainage (SAGD). Wastewater or liquid containing contaminants may be processed through the EOX reactor 110 by pumping the wastewater into the EOX reactor cell pack 113 such that the wastewater fills the interior space of the reactor 110 and the spaces in between the electrode plates 204a and 204b. When the EOX reactor 110 is filled with liquid or wastewater and flow is observed, the interior of the EOX reactor 110 can become energized by the power supply 104 and be operated under pressure. The interior of the EOX reactor 110 can be pressurized up to 90 psi or greater to the maximum allowable operating pressure rating of the EOX reactor 110. However, in one aspect, this would be less than 150 psi. In another aspect, this pressure would be less than 100 psi at 80° C. but above 50 psi. In one aspect, this voltage range supplied between the first electric conductor 114 and the second electric conductor 115 could be between 0.001 and 20 volts.

With reference to FIG. 2, an electrode assembly 202 that can be loaded into the EOX reactor 110 is shown. The electrode assembly 202 comprises a first set of electrode plates 204a operatively connected to a first electrical conductor 114 and a second set of electrode plates 204b operatively connected to the second electrical conductor 115. Each set of electrode plates of 204a and 204b can be formed of an electrically conductive material such as carbon steel, aluminum, mixed metal oxide (such as titanium substrate with specialized coating) or a combination thereof. DC power supply 104 applies a voltage across the first electric conductor 114 and alternatively the second electric conductor 115 such that the voltage is passed to the electrode plates 204a and 204b, alternatingly and electrically connected to the first electric conductor 114 and the second electric conductor 115 forming a first set of electrode plates 204a operatively connected to the first electrical conductor 114 and a second set of electrode plates 204b operatively connected to the second electrical conductor 115. Adjacent electrode plates 204a and 204b act as anode-cathode pairs and create a mono-polar electric field between adjacent electrode plates 204a and 204b in the electrode assembly 202. This can cause a number of things to happen with the liquid being treated. The electrical field created between adjacent electrode plates 204a and 204b can cause electrocoagulation to occur in the liquid being treated. The electrical field passing through the wastewater 102 being treated destabilizes the contaminants in the liquid and can cause chemical reactions and precipitation or coalescence of colloids within the liquid. Electrocoagulation can cause a coagulant to be added to the water being treated, through the dissolution of a sacrificial metal anode. The metal ions that are released form reactive metal hydroxides that act as destabilizing agents and leads to charge neutralization, causing pollutants to coagulate and be removed. Electrocoagulation water treatment however may involve several chemical and physical mechanisms in the aqueous medium. When wastewaters are subjected to varying low and high current densities, subsequent variations in size of the coagulated particles may be generated, thereby influencing the removal pathway. Periodically alternating the polarity of the electrode plates 204a and 204b via electrical conductors 114 and 115 may cause any particles that have adhered to the surface of the electrode plate 204a and 204b to be released from the electrode plate 204a and 204b when the polarity is reversed and back into the liquid being treated.

Furthermore, the power input from power supply 104 can be set so that a desired current density can be applied to the wastewater between the electrode plates 204a and 204b. In one aspect, this current density can range between 0.01 A/sq. in. to 10 A/sq.in. The contaminants in the waste stream and the associated conductivity dictates how much power and gap between electrode plates 204a and 204b will be required to treat the liquid. This power can be supplied for a period of time to allow the electro-coagulation to work and the contaminants to destabilize out of the liquid. The elevated pressure can be maintained while the power is being supplied.

In one aspect, the design of the gap between the electrode plates 204a and 204b may be adjusted according to the conductivity of the wastewater stream 102. For example, under low conductivity conditions, the gap between the electrodes from 204a and 204b may be decreased and under high conductivity conditions, the gap between the electrodes from 204a and 204b may be increased. Once the wastewater has been treated to destabilize the contaminants, e.g. silica, H2S, etc. the wastewater can be evacuated from the EOX reactor 110 through EOX reactor outlet 112 and is directed downstream for further treatment in the ozone reactor 120. Details of the ozone reactor 120 will be described with reference to FIGS. 3 and 4 hereinafter.

Figure 5:
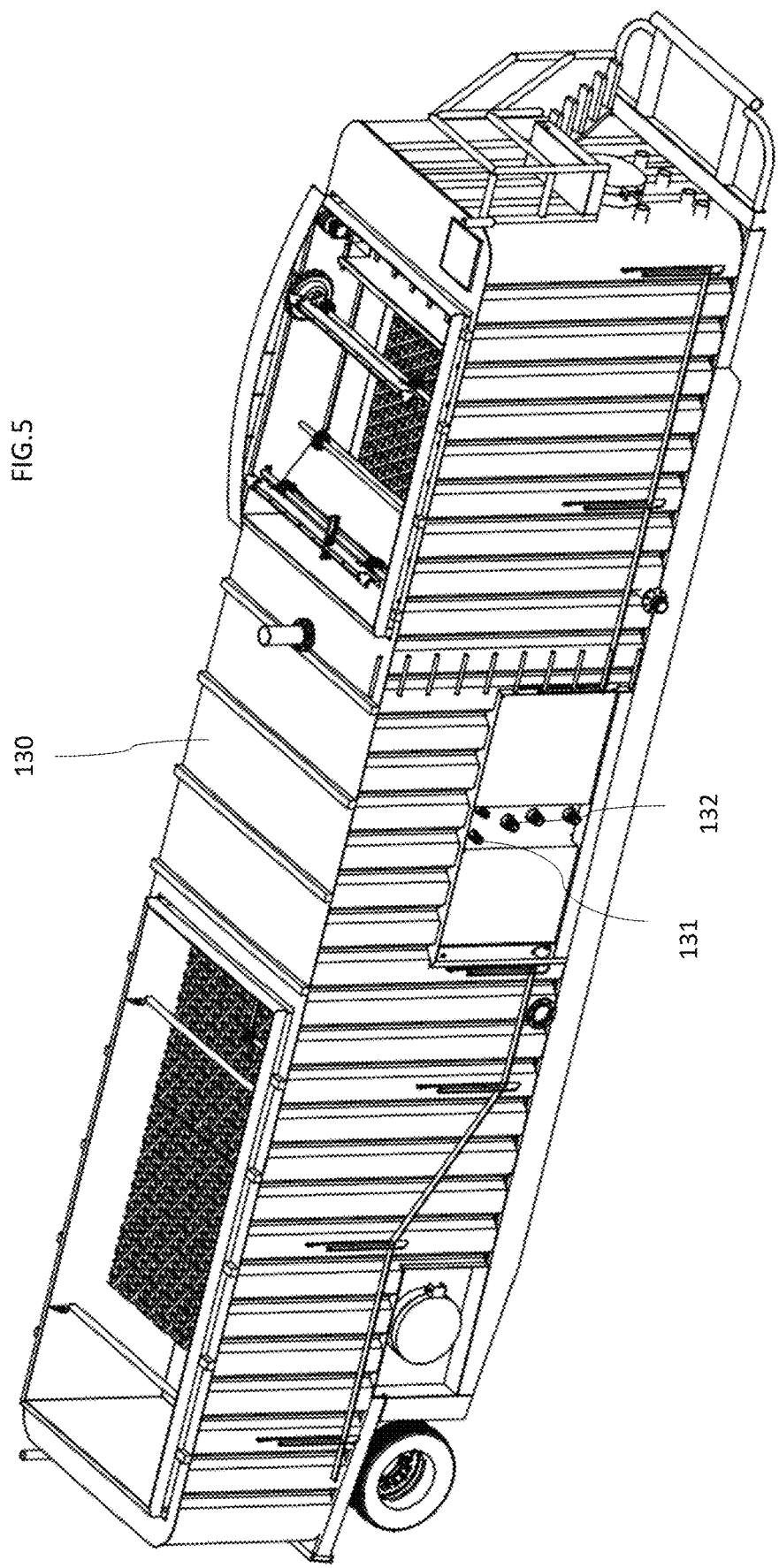
FIG. 5 is a perspective view of a Dissolved Air Flotation tank.

FIGS. 3 and 4 show an example of an ozone reactor 120. In the ozone reactor 120, ozone is introduced from an ozone generator at 122 into the wastewater that passes through EOX reactor outlet 112 (ozone reactor inlet 112 of the ozone reactor 120). Ozone has the ability to oxidize contaminants. Ozone molecules can react with a substrate (direct pathway) or with hydroxide ions or radicals (indirect pathway). The pathway to oxidation depends on the reaction rate of the ozone and substrate, and the reaction products that may promote or inhibit ozone decomposition. This oxidation efficiency is also dependent on the properties of the waste stream, such as pH, alkalinity, temperature, and organic matter. Oxidation by way of ozone happens rapidly at the point where ozone is injected into the wastewater in the ozone reactor 120 and continues as the commingled ozone-liquid stream moves through. In another aspect, after the liquid or wastewater has passed through the ozone reactor 120, the wastewater may pass through DAF tank 130 at DAF tank inlet 131 and DAF tank outlet 132 shown in FIG. 5. The DAF tank 130 uses fine gas bubbles such as air and nitrogen, depending on area classification, to support and increase the separation of the bulk mass of particulates that have formed as a result of the upfront EOX reactor 110 and the ozone reactor 120. The wastewater 102 then feeds into an effluent tank or clear well, where wastewater may further be pumped through a filtration mechanism 150. In one aspect, the filtration may be, but not limited to, walnut shells, greensand, or membrane, depending on final wastewater 102 quality. In one aspect, the filter mechanism may be automatically backwashed to remove solids, oils and other particulates and material that has been filtered from the wastewater.

Figure 6:
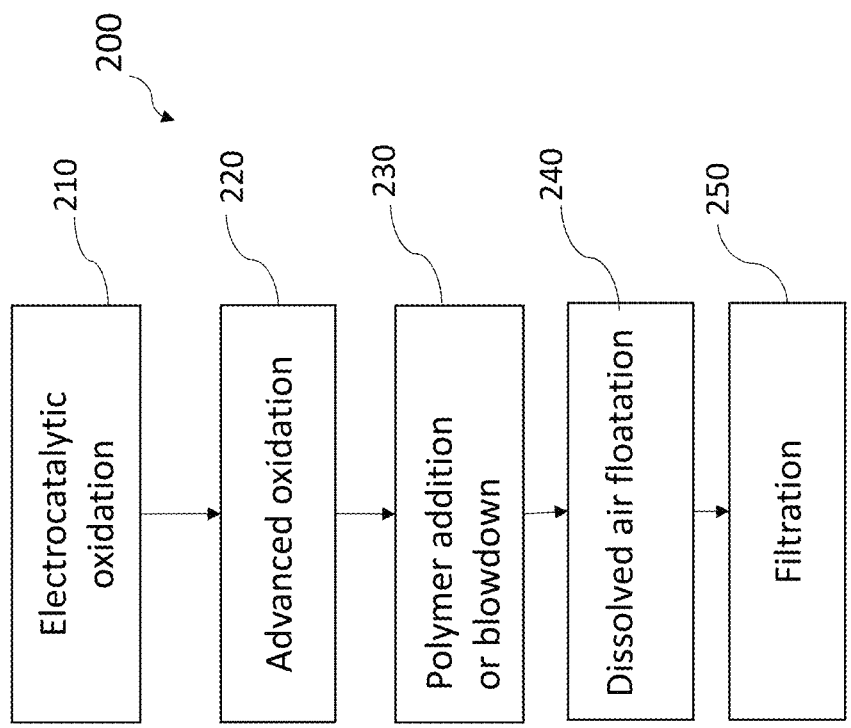
FIG. 6 is a flowchart of wastewater treatment process.

FIG. 6 illustrates an example of the wastewater treatment process 200 that effectively removes silica, oil and grease, H2S, iron, and other contaminants from the wastewater from oil production, especially the produced water in steam-assisted gravity drainage described hereinafter. The wastewater treatment process 200 can include the steps of electrocatalytic oxidation 210, advanced oxidation 220, polymer addition or blowdown 230, dissolved air floatation 240 and filtration 250.

At step 210, the wastewater or liquid containing contaminants is first subjected to electric oxidation in the EOX reactor 110. Electric oxidation (EOX) is a means of adding a coagulant to water in situ, through the dissolution of a sacrificial metal anode. The metal ions that are released form reactive metal hydroxides that act as destabilizing agents and leads to charge neutralization, causing pollutants to coagulate and be removed. The electric oxidation involves several physical and chemical processes. A voltage is supplied to a pair of electrode plates placed in the wastewater to causes the metal ions release from the reactive metal hydroxides as discussed in the embodiment. In operation, a voltage is applied to the electrodes such that Fe (ferrous ions) is liberated from the anodes and may electrically neutralize with the silica particles that are in close proximity to the anodic surface.

At step 220, after the EOX treatment, wastewater may be further treated in one aspect with an advanced oxidation technique using ozone. Ozone may be introduced into the liquid via the ozone generator 122 such that the ozone molecules may react with a substrate or with hydroxide ions or radicals. Residual Fe may diffuse out into the produced water and may form various Fe hydroxyl species, causing oxidization with the dissolved hydrogen sulfide present in the waste stream. By adding ozone when there are trace amounts of hydrogen sulfide, the remaining unoxidized Fe may be further oxidized and may destroy the remaining hydrogen sulfide. Furthermore, residual Fe that has not become bound or enmeshed with silica particles, with the addition of ozone, may potentially generate additional coproducts in the waste stream and coprecipitate out additional silica, total organic carbon, oils and grease, metals, organic acids, etc. in the form of flocs or sludge. The floating floc material and sludge created as a result of the electro-coagulation and ozone stages of the process may settle or skim off the surface in the DAF tank 130. In order to strengthen the flocs formed as a result of the upfront process, a polymer may be added to agglomerate the finer flocs to increase the overall removal efficiency in the DAF tank 130 at step 230 described hereinafter.

In one aspect, at step 230, wastewater may be further treated with polymer addition. For example, polymer may be added at blowdown fluid inlet 124 shortly after in the ozone reactor 120 to bind, bridge and strengthen the developed floc contaminants (bridges colloids together) after the EOX process 110 and prior to the DAF tank 130. With its increased particle size and weight, in can be more easily removed in the DAF tank 130 or settled out.

In another aspect, at step 230, blowdown may be added with or without polymer. The addition of blowdown may increase the pH of the produced water, providing the ability to increase removal efficiency of the silica in the process along with reducing the overall hardness to help precipitate out additional silica.

Although destabilization through the EOX reactor 110 and ozone reactor 120 occurs leading to coagulation (floc formation) at step 210 and 220 respectively, majority of the silica may be removed in the DAF tank 130 at step 240. The DAF tank 130 is designed for the removal of suspended solids (TSS)/flock, oils and grease, and other contaminant particulate by way of floatation and a scraper mechanism. During step 240, the main floatation portion of the DAF tank 130 is exposed to fine gas bubbles which are created by the mixing of the wastewater and gas under high pressures and injected through non-clogging aeration devices. These fine gas bubbles are continuously introduced to the wastewater by recirculation. With the formation of these micro gas bubbles, a slower rise rate through the wastewater is created (Stokes Law), along with an increase in surface area, create an improvement in overall performance of the DAF tank 130. The DAF tank 130 can also incorporate corrugated plate pack that generates counter-current separation which increases the separation area thereby ensuring that even the smallest of pin flocs are removed from the treated wastewater. Due to the corrugations, particles will all tend to move through the top of the corrugation. This results in coalescing and higher rising rates. After the bulk mass of silica has been removed during step 240, a filter mechanism 150 may be used at step 250 for the removal of residual contaminants such as trace oils and greases, iron and/or other precipitates at step 250 and will be described hereinafter.

At step 250, the residuals such as iron, manganese, H2S, arsenic, and radium are further be filtered and removed. In one aspect, the filtration material used in step 250 in the filter mechanism 150 can be black walnut shells which may be effective to capture residual oils, suspended particulates, and other contaminants. Tables 1-4 below include data of four different samples with information related characteristics of the wastewater feed at various stages of the process.

TABLE 1

Content of wastewater during each step of the process of treating the wastewater (Sample 1)

|  | Unit | EOX Reactor Inlet 111 | EOX Reactor outlet 112 | Ozone Reactor Outlet 131 | DAF Tank Outlet 132 | Filtration Mechanism Outlet 160 |
|---|---|---|---|---|---|---|
| pH | pH | 9.03 | 8.09 |  | 8.78 | 8.68 |
| Hardness (CaCO3) | ppm | 474 | 344 |  | 206 | 186 |
| Hardness Reduction | % |  | 27.4% |  | 56.5% | 60.8% |
| Dissolved Iron | ppm | 0.2 | 2.8 |  | 0.2 | 0.2 |
| Dissolved Iron Change | % |  | −1300% |  | 0% | 0% |
| Oil in Water (TD-500) | ppm | 10.8 | 3.6 |  | 3.5 | 3.6 |
| Oil in Water Reduction | % |  | 66.7% |  | 67.6% | 66.7% |
| Silica (SiO2) | ppm | 126 | 8 |  | 13 | 16 |
| Silica (SiO2) Reduction | % |  | 93.9% |  | 89.5% | 87.6% |

TABLE 2

Content of wastewater during each step of the process of treating the wastewater (Sample 2)

|  | Unit | EOX Reactor Inlet 111 | EOX Reactor outlet 112 | Ozone Reactor Outlet 131 | DAF Tank Outlet 132 | Filtration Mechanism Outlet 160 |
|---|---|---|---|---|---|---|
| pH | pH | 9.57 | 9.08 | 9.03 | 8.70 | 8.72 |
| Hardness (CaCO3) | ppm | 363 | 128 | 168 | 174 | 165 |
| Hardness Reduction | % |  | 64.7% | 53.7% | 52.1% | 54.5% |
| Dissolved Iron | ppm | 0.2 | 1.6 | 1.3 | 0.2 | 0.2 |
| Dissolved Iron Change | % |  | −700% | −550% | 0% | 0% |
| Oil in Water (TD-500) | ppm | 5.9 | 3.5 | 2.8 | 3.3 | 4.6 |
| Oil in Water Reduction | % |  | 40.7% | 52.5% | 44.1% | 22.0% |
| Silica (SiO2) | ppm | 126 | 12 | 21.1 | 17 | 25 |
| Silica (SiO2) Reduction | % |  | 90.2% | 83.3% | 86.5% | 80.2% |

TABLE 3

Content of wastewater during each step of the process of treating the wastewater (Sample 3)

|  | Unit | EOX Reactor Inlet 111 | EOX Reactor outlet 112 | Ozone Reactor Outlet 131 | DAF Tank Outlet 132 | Filtration Mechanism Outlet 160 |
|---|---|---|---|---|---|---|
| pH | pH | 9.54 | 9.13 | 9.13 | 8.96 | 8.99 |
| Hardness (CaCO3) | ppm | 503 | 291 | 275 | 277 | 219 |
| Hardness Reduction | % |  | 42.1% | 45.3% | 52.1% | 54.5% |
| Dissolved Iron | ppm | 0.2 | 5 | 2.1 | 1.3 | 1 |
| Dissolved Iron Change | % |  | −2400% | −950% | −550% | −400% |
| Oil in Water (TD-500) | ppm | 1870 | 1420 | 1590 | 6.4 | 4.2 |
| Oil in Water Reduction | % |  | 24.1% | 15.0% | 99.7% | 99.8% |
| Silica (SiO2) | ppm | 133 | 26 | 39 | 58 | 40 |
| Silica (SiO2) Reduction | % |  | 80.4% | 70.6% | 56.2% | 69.8% |

TABLE 4

Content of wastewater during each step of the process of treating the wastewater (Sample 4)

| | Unit | EOX Reactor Inlet 111 | EOX Reactor outlet 112 | Ozone Reactor Outlet 131 | DAF Tank Outlet 132 | Filtration Mechanism Outlet 160 |
|---|---|---|---|---|---|---|
| pH | pH | 9.58 | 9.20 | 9.03 | 8.96 | 8.67 |
| Hardness (CaCO3) | ppm | 404 | 149 | 202 | 232 | 267 |
| Hardness Reduction | % | | 63.1% | 50.0% | 42.6% | 33.9% |
| Dissolved Iron | ppm | 0.1 | 1.3 | 1 | 0.8 | 0.7 |
| Dissolved Iron Change | % | | −1200% | −900% | −700% | −600% |
| Oil in Water (TD-500) | ppm | 6.8 | 5.8 | 3.4 | 4 | 3.8 |
| Oil in Water Reduction | % | | 14.7% | 50.0% | 41.2% | 44.1% |
| Silica (SiO2) | ppm | 125 | 11 | 26 | 44 | 53 |
| Silica (SiO2) Reduction | % | | 91.6% | 79.2% | 64.8% | 57.7% |

TABLE 5

Changes in Turbidity

| | Unit | EOX Reactor Inlet 111 | EOX Reactor outlet 112 | Ozone Reactor Outlet 131 | DAF Tank Outlet 132 | Filtration Mechanism Outlet 160 |
|---|---|---|---|---|---|---|
| pH | pH | 8.32 | 8.27 | 8.31 | 8.83 | 8.81 |
| Turbidity | NTU | 26.2 | 253 | 95.9 | 26.8 | 4.11 |

With reference to FIGS. 1 and 6, and Tables 1-4, the wastewater feed is introduced to the EOX reactor inlet 111 and goes through the EOX reactor 110 where electric oxidation (EOX treatment) occurs and exits through EOX reactor outlet 112. This is illustrated as step 210 in FIG. 6. As can be seen by each of Tables 1-4, the hardness (measured by the calcium carbonate, $CACO_3$ content) reduced from 474 to 344 ppm, resulting in a 27.4% drop in Table 1, 363 to 128 ppm resulting in a 64.7% drop in Table 2, 503 to 291 ppm resulting in a 42.1% drop in Table 3 and 404 and 149 ppm resulting in a 63.1% drop in Table 4. The oil content also significantly reduced from 10.8 to 3.6 ppm, 5.9 to 3.5 ppm, 1870 to 1420 ppm, and 6.8 to 5.8 ppm resulting in 66.7%, 40.7%, 24.1%, and 14.7% drops in Tables 1-4, respectively. Silica content also dropped significantly within the EOX reactor 110 from 126 to 8 ppm, 126 to 12 ppm, 133 to 26 ppm and 125 to 11 ppm resulting in 93.9%, 90.2%, 80.4 and 91.6% drops in Tables 1-4, respectively.

After exiting the EOX reactor outlet 112, the wastewater feed went through the ozone reactor 120 and exit through outlet 131. Within the ozone reactor 130, or step 220 in FIG. 6, ozone was added via the ozone generator 122 to aid in oxidation of ferric and other constituents. Iron content of the wastewater feed increased after being processed in the EOX reactor 110 as a result of iron in the coagulant dosage provided that allowed for the reactions with the contaminants to take place. As can be seen by Table 1, initially at the EOX reactor inlet 111, the dissolved iron content was 0.2 in Tables 1-3, and 0.1 in Table 4, and increased to 2.8 ppm, 1.6 ppm, 5 ppm, and 1.3 ppm in Tables 1 to 4, respectively, resulting in negative % changes. Furthermore, as seen in each of Tables 1 to 4, oil in water content may increase after ozone is added and dissolved in air because the wastewater feed is oxidized resulting in additional dispersion of oil droplets. Silica content may increase slightly after the wastewater feed is processed in the EOX reactor 110 because after ozone is added and the wastewater feed oxidizing there may be a loss of electrons, increasing the content of silica.

Furthermore, blowdown may be added to the process at step 230 (as shown in FIG. 6), or alternatively before step 210, to further reduce the hardness of the wastewater feed thereby further reducing the silica and iron content.

Referring to Table 3, after exiting the ozone reactor 120, the wastewater was fed into the DAF tank 130 and exited through DAF tank outlet 132. Within this step 240, the primary purpose of the DAF tank 130 was to remove the bulk mass of solids that have been precipitated out of the wastewater as a result of steps 210 and 220. As shown in Table 3, the oil and water content reduced from 1590 ppm to 6.4 ppm from the ozone reactor outlet 131 to the DAF tank outlet 132. Increases in silica content, e.g. Table 3 may be a result of the coagulant that was added. Furthermore, dissolved iron content reduced in from 2.1 ppm to 1.3 ppm in Table 3. The addition of polymer may improve/assist in the removal performance of the bulk mass from DAF tank 130 by 'gluing' the solids together such that they can be floated and skimmed from the surface. As shown in Table 5, the turbidity or opacity of the water increased from 26.2 NTU to 253 NTU from the EOX reactor inlet 111 to the EOX reactor outlet 112 and then decreased significantly to 95.9 NTU at the ozone reactor outlet 131 as result of the coagulant dosage that was added during EOX treatment.

The wastewater was then fed thorough the filtration mechanism 150 and exited through main effluent outlet 160 where, at step 250 further removal of the particulate took place. As can be seen by Table 4 with the filtration mechanism 150, the dissolved iron content reduced from 0.8 to 0.7 ppm in Table 4. The filtration mechanisms used depends on end user-requirement. for example, eastern black walnut shells may be desirable if higher than expected oil in water concentrations are present. Alternatively, the use of greensand may be used if greater reduction of ferric is desirable. Step 250 can accommodate a wide range of mechanisms that are suitable for the wastewater treatment output conditions from steps 210 through 240.

Figure 7:
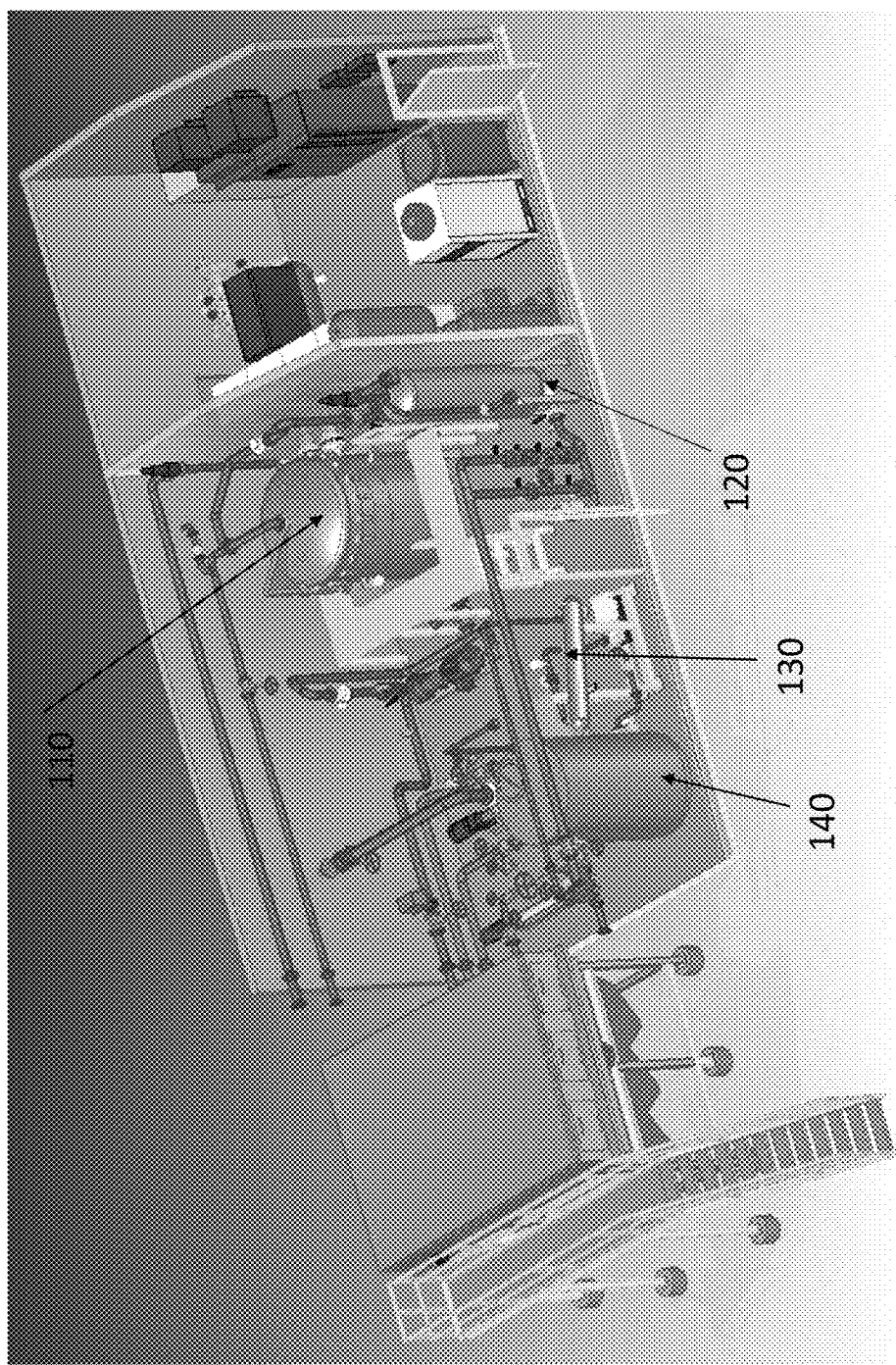
FIG. 7 is a perspective view of a module of part of the wastewater treatment system of FIG. 1.
Figure 8:
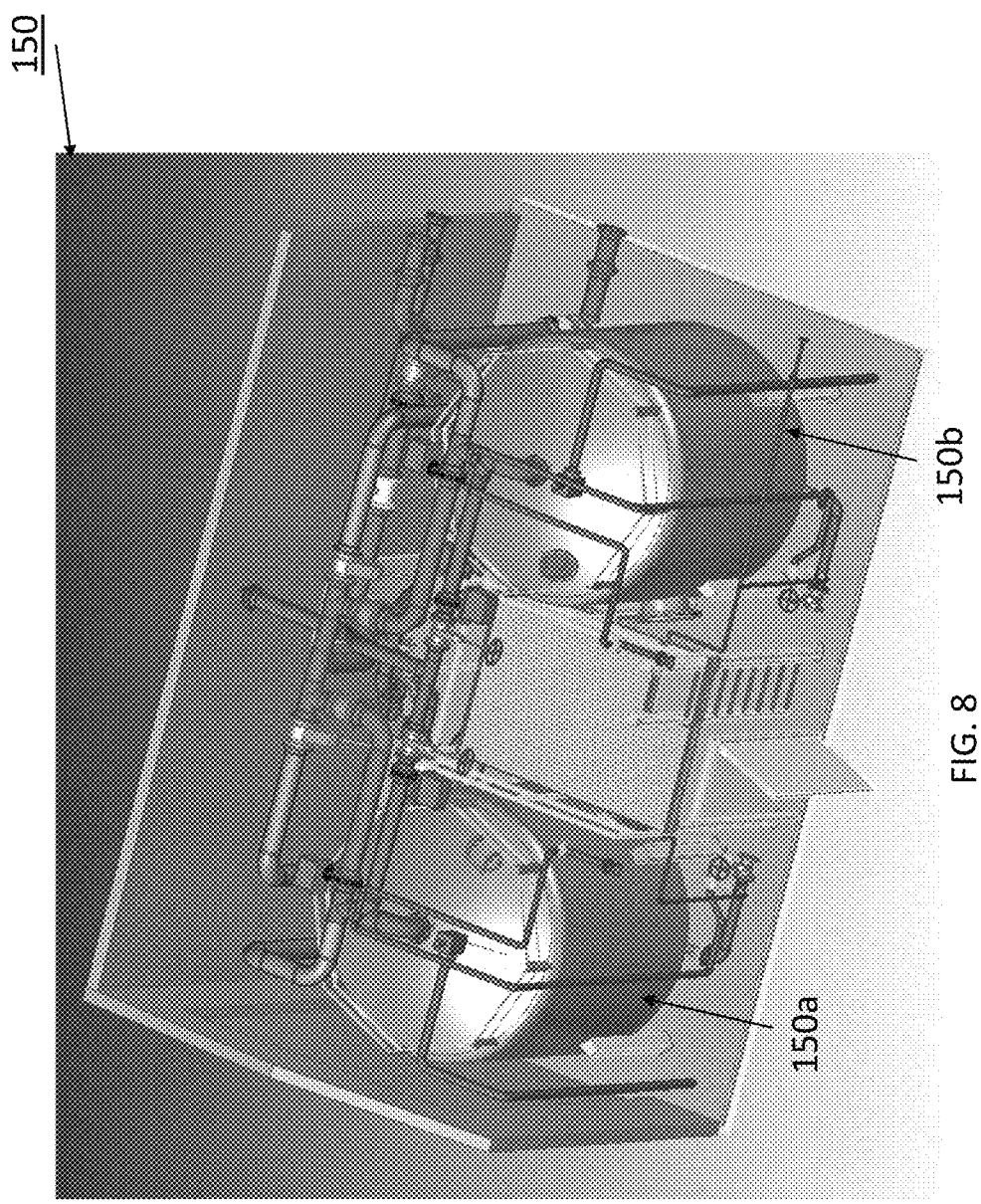
FIG. 8 is a perspective view of another module of part of the wastewater treatment system of FIG. 1.

Referring to FIGS. 7-8, in use, the main components EOX reactor 110 and the ozone reactor 120 of the wastewater treatment system 100 may be of modular construction and situated inside of self-framing structures. The packages can be shipped to site and installed on piles with minimal reassembly except for the interconnection between the self-framing structures and tie points in and out of the structures. The DAF tank 130 may be situated externally or could be placed within a similar structure. In one aspect, FIG. 7 shows a module of the EOX reactor 110 and the ozone reactor 120 that can be situated inside a frame structure and shipped as one unit with the DAF tank 130 outside of such structure. FIG. 8 shows a module of the two filtration trains 150a and 150b that can be suited in another frame structure and shipped as one unit. Although the examples of FIG. 7 and FIG. 8 show the modules outdoors, the modules can also be placed indoors, suitable for the desired area classification requirements. The modules can be designed for integration into existing SAGD facilities or as portable, moveable trailer units that can be installed in semi-permanent type of application.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method for treating a liquid containing silica during oil production, the method comprising:
   providing an electric oxidation reactor to treat the liquid to electric oxidation treatment;
   feeding the liquid containing silica into the electric oxidation reactor and adding a coagulant to separate contaminants including silica from the liquid to produce a coagulated liquid;
   providing an ozone reactor for receiving the coagulated liquid from the electric oxidation reactor;
   adding ozone to the coagulated liquid in the ozone reactor to destruct hydrogen sulfide and to disinfect and oxidize contaminants in the coagulated liquid to form an ozone-liquid, wherein the ozone-liquid contains ozone;
   providing a dissolved air floatation tank for receiving the ozone-liquid from the ozone reactor;
   removing a suspended mass containing silica in the ozone-liquid to form an initially treated liquid;
   providing a filtration mechanism for receiving the initially treated liquid; and
   filtering residual oils and contaminants from the initially treated liquid using the filtration mechanism to form a filtered liquid,
   wherein polymer is added to the ozone-liquid.

2. The method of claim 1 wherein the coagulant is added in the electric oxidation reactor by dissolution of a sacrificial metal anode.

3. The method of claim 1 wherein the electric oxidation reactor comprises an electrode assembly including a pair of electrode plates with a gap therebetween, the gap being adjustable according to conductivity of the liquid.

4. The method of claim 3 wherein the pair of electrode plates are formed of any one of: carbon steel; aluminum; mixed metal oxide; and a combination thereof.

5. The method of claim 1 further adding blowdown to the ozone-liquid.

6. The method of claim 1 further comprising providing an aeration device for injecting gas into the dissolved air floatation tank for creating fine gas bubbles generated by mixing of the liquid and the gas in the dissolved air floatation tank.

7. The method of claim 1 wherein the dissolved air floatation tank includes a corrugated plate pack that increases separation of the suspended mass.

8. The method of claim 1 wherein the filtration mechanism comprises any one of walnut shell, greensand, and membrane, depending on final quality of the initially treated liquid.

9. The method of claim 1 further comprising providing a disposal tank for receiving any remaining contaminants from the dissolved air floatation tank and the filtration mechanism.

\* \* \* \* \*